(12) United States Patent
Dirschl et al.

(10) Patent No.: US 7,053,148 B2
(45) Date of Patent: May 30, 2006

(54) COMPOSITIONS OF POLYSILOXANES, FLUOROPOLYMERS EXTENDERS

(75) Inventors: Franz Dirschl, Augsburg (DE); Edeltraud Schidek, Augsburg (DE); Thu Thao Reimann-Dang, Halle/Westfalen (DE); Rolf Moors, Bonstetten (DE); Simpert Lüdemann, Bobingen (DE); Wilhelm Artner, Motzenhofen (DE); Heinz Gaugenrieder, Zusmarshausen (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 24 days.

(21) Appl. No.: 10/479,946

(22) PCT Filed: Aug. 3, 2002

(86) PCT No.: PCT/EP02/08676

§ 371 (c)(1),
(2), (4) Date: Dec. 4, 2003

(87) PCT Pub. No.: WO03/014180

PCT Pub. Date: Feb. 20, 2003

(65) Prior Publication Data

US 2004/0249165 A1    Dec. 9, 2004

(30) Foreign Application Priority Data

Aug. 9, 2001 (DE) ................. 101 39 126

(51) Int. Cl.
*C08L 83/04* (2006.01)
(52) U.S. Cl. ...................... 524/588; 525/474
(58) Field of Classification Search ............. 524/588; 525/474
See application file for complete search history.

(56) References Cited

U.S. PATENT DOCUMENTS

| | | | |
|---|---|---|---|
| 3,356,628 A | 12/1967 | Smith et al. | 260/29.6 |
| 3,478,116 A | 11/1969 | Smeltz | 260/633 |
| 3,528,849 A | 9/1970 | Vullo et al. | 117/139.5 |
| 3,896,251 A | 7/1975 | Landucci | 428/290 |
| 3,968,066 A | 7/1976 | Mueller | 260/29.2 |
| 4,054,592 A | 10/1977 | Dear et al. | 560/25 |
| 4,098,742 A | 7/1978 | Mueller | 260/29.2 |
| 4,366,001 A | 12/1982 | Ona et al. | 106/287.11 |
| 4,477,498 A | 10/1984 | Deiner et al. | 427/389.9 |
| 4,620,878 A | 11/1986 | Gee | 106/287.15 |
| 4,742,140 A | 5/1988 | Greenwood et al. | 526/245 |
| 4,834,764 A | 5/1989 | Deiner et al. | 8/115.64 |
| 4,898,981 A | 2/1990 | Falk et al. | 568/28 |
| 4,946,992 A | 8/1990 | Falk et al. | 560/227 |
| 5,019,428 A | 5/1991 | Lüdemann et al. | 427/387 |
| 5,045,624 A | 9/1991 | Falk et al. | 528/70 |
| 5,047,065 A | 9/1991 | Vogel et al. | 8/115.6 |
| 5,112,930 A | 5/1992 | Lüdemann et al. | 528/28 |
| 5,219,905 A | 6/1993 | Carrozza et al. | 524/102 |
| 5,258,458 A | 11/1993 | Allewaert et al. | 525/104 |
| 5,276,175 A | 1/1994 | Dams et al. | 560/27 |
| 5,321,066 A | 6/1994 | Carrozza et al. | 524/103 |
| 5,324,763 A | 6/1994 | Rössler et al. | 524/368 |
| 5,508,370 A | 4/1996 | Reiff et al. | 528/45 |
| 5,540,952 A | 7/1996 | Canivenc et al. | 427/387 |
| 5,578,665 A | 11/1996 | Carrozza et al. | 524/99 |
| 5,688,889 A | 11/1997 | Canivenc et al. | 528/40 |
| 6,080,830 A | 6/2000 | Dirschl et al. | 528/45 |
| 6,306,958 B1 | 10/2001 | Dirschl et al. | 524/805 |

FOREIGN PATENT DOCUMENTS

| | | |
|---|---|---|
| EP | 0342830 | 11/1989 |
| EP | 0342834 | 11/1989 |
| EP | 0441530 | 8/1991 |
| EP | 0978586 | 2/2000 |
| WO | 99/14422 | 3/1999 |

OTHER PUBLICATIONS

English Language Abstract for EP 0978586 (2000).

*Primary Examiner*—Kuo-Liang Peng
(74) *Attorney, Agent, or Firm*—Kevin T. Mansfield

(57) ABSTRACT

Fiber materials in the form of fabrics receive, as a result of treatment with compositions according to the invention, a pleasant soft hand and excellent oil-and water-repelling properties with good permanence. The compositions can be obtained by a) preparing a solution of a polysiloxane and an extender with blocked isocyanate groups in an organic solvent, b) dispersing this solution in water, c) removing the organic solvent and d) combining the aqueous dispersion obtained with a second aqueous dispersion which comprises a polymer with perfluoroalkyl groups. One variant of this preparation process consists in cousing a polymer with perfluoroalkyl groups as early as in step a). In this case, step d) can be omitted.

28 Claims, No Drawings

COMPOSITIONS OF POLYSILOXANES, FLUOROPOLYMERS EXTENDERS

The invention relates to compositions which comprise polymers with perfluorinated radicals, polyorganosiloxanes and extenders in the form of compounds with blocked isocyanate groups and which can be prepared by means of a special process. It further relates to the use of such compositions for the treatment of fiber materials, in particular of fabrics.

It is known to treat fabrics, in particular in the form of wovens or knits, with compositions which comprise compounds with perfluorinated radicals ($R_F$ groups). As a result of this, oil- and water-repelling properties are imparted to the textiles. Such processes for textile finishing are described, for example, in EP-A 314 944.

If textiles are finished with compositions which comprise only fluoropolymers without further additives, then relatively large amounts of expensive $R_F$-group-containing polymers are required in order to achieve adequate oil- and water-repelling properties on the textile material. For this reason, processes have been developed in which the fluoropolymers have been used together with what are termed extenders. These extenders increase the action of the fluoropolymers and allow savings to be made because when extenders are used, the amounts of fluoropolymers required are smaller. Compounds with blocked isocyanate groups have become known as highly effective extenders.

The finishing of textiles with $R_F$-group-containing polymers and extenders is described, inter alia, in U.S. Pat. No. 4,834,764, EP-A 872 503, EP-A 1 013 687 and U.S. Pat. No. 5,324,763. Although good oil- and water-repelling properties on textiles can be achieved using extenders and fluoropolymers, such systems have the disadvantage that the hand of textiles finished therewith is often too harsh. Attempts have therefore been made to use fluoropolymers together with soft hand agents, e.g. with polysiloxanes. It is known that a number of polyorganosiloxanes impart a pleasant soft hand to textiles.

The use of a combination of fluoropolymers and polyorganosiloxanes for textile finishing is evident, for example, from U.S. Pat. No. 4,098,742, U.S. Pat. No. 5,276,175, EP-A 325 918 and U.S. Pat. No. 5,258,458. In this connection, compositions in which fluoropolymer and polysiloxane are present alongside one another in the form of two different polymers, and also compositions in which a copolymer is present which contains both perfluorinated radicals ($R_F$ groups) and also organosiloxane units are known.

These last-named compositions known from the prior art also have disadvantages as well as advantages. Thus, for example, the addition of a polysiloxane to a finished fluoropolymer emulsion leads, in the normal case, to the effect of the fluoropolymer, in particular the oil-repelling effect, being reduced. This reduction in the effect compared with that which could be achieved with the sole use of fluoropolymer arises particularly after the finished textiles have been washed and ironed. In other words, the permanency of the oil-repellency and optionally also the water-repellency when these systems are used is in need of improvement. In this connection, it is unimportant whether the polysiloxane is added as it is to a finished aqueous fluoropolymer dispersion or in the form of a preprepared aqueous polysiloxane emulsion. The same is true when an extender based on blocked isocyanates is added to the fluoropolymer dispersion before or after the polysiloxane has been added.

The use of copolymers in which polysiloxane units are present together with units which contain perfluorinated groups has been unable to satisfactorily solve the problem of the reduction in effect either.

The object of the present invention was to provide compositions with which, on the one hand, a very pleasant soft hand can be imparted to textile materials and, on the other hand, highly effective oil- and water-repelling properties with high permanence after washing operations.

This object was achieved by a composition obtainable by the following successive process steps a) preparation of an anhydrous solution which comprises the components A), B) and C) and optionally a component D), b) dispersion of the solution obtained according to step a) in water using a dispersant or a mixture of dispersants, c) removal of component C), d) optional combination of the dispersion obtained according to process step c) with an aqueous dispersion which comprises a component D), where, at least for the case where the solution prepared in step a) does not comprise a component D), a process step d) is then carried out after step c), where component A) is a polyorganosiloxane whose endgroups are formed by units of the formula

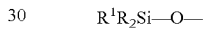

and which contains units of the formula

in the chain, where the individual units —Si(R)(R$^2$)—O— may be distributed arbitrarily over the polysiloxane chain, where all radicals R, independently of one another, are a linear or branched alkyl radical having 1 to 20 carbon atoms or the phenyl radical, all radicals R$^1$, all independently of one another, are R, H, —(CH$_2$)$_u$—W or are a monovalent aliphatic radical which contains one or more amino groups, where u is a number from 0 to 4 and W is OH or OR, where all of the radicals R$^2$ present, independently of one another, are H, R, R$^3$ or X, where R$^3$ is an alkyl radical having 5 to 18 carbon atoms which is interrupted by an oxygen atom and/or in which two adjacent carbon atoms form an epoxy group together with an oxygen atom, or where R$^3$ is an alkyl radical having 2 to 12 carbon atoms which carries a phenyl radical as substituent, and where X is a monovalent hydrocarbon radical which contains one or more amino groups and/or one or more hydroxyl groups as substituents, where the amino groups present are optionally in partially or completely quaternized form and the appertaining anions are preferably chosen from chloride anions, methylsulfate anions, benzenesulfonate anions, alkylarylsulfonate anions and carboxylate anions, where the carboxylate anions are preferably anions of a monocarboxylic acid having 1 to 4 carbon atoms and the alkylarylsulfonate anions are preferably toluenesulfonate anions, where component B) is a fluorine-free diisocyanate or polyisocyanate whose NCO groups are 80 to 100% blocked, where component C) is a water-insoluble organic solvent which does not contain any OH groups and whose boiling point at atmospheric pressure is between 30° C. and 200° C. and where component D) is a polymer which contains one or more perfluorinated radicals ($R_F$) and no silicon, or where component D) is a mixture of such polymers.

It was surprising that using said process steps, compositions are obtained which are superior to compositions comprising polysiloxane and fluoropolymers and known from the prior art with regard to level and/or permanence of the effects, in particular the oil-repelling effect of finished textiles. By firstly dissolving extender (component B) and polyorganosiloxane (component A) in an organic solvent (component C) and dispersing the resulting solution in water, advantages arise after the other process steps have been carried out compared with compositions known from the prior art which are prepared by successively adding polysiloxane or polysiloxane dispersion and extender to a finished aqueous dispersion of a fluoropolymer. The decisive difference of the invention compared with the prior art is therefore that, in a first step (process step a), polyorganosiloxane and extender are dispersed together (in the form of an anhydrous solution) in water. A further advantage of compositions according to the invention is that in many cases the desired soft hand level on the textiles can be achieved using considerably smaller amounts of polyorganosiloxane than when using known formulations with an identical content of fluoropolymer.

Said advantages are obtained irrespective of which of the two process variants described below in detail is carried out (either use of component D) as early as in step a) or addition of component D) only in step d)). Which of the two variants produces better results than the other may depend, inter alia, on the nature of the $R_F$ polymer.

Compositions according to the invention can be obtained by process steps a) to c) and optionally then d), which are carried out in this order (a→b→c) or (a→b→c→d).

In step a), an anhydrous solution is prepared which comprises the components A), B) and C) described below. In this connection, "anhydrous" is to be understood as meaning that the components A), B) and C) are used in virtually anhydrous form to prepare the solution; traces of water which are present as impurity, however, are not normally troublesome. To prepare the solution, components A) and B) can be used in pure form; it is, however, also possible to preprepare a solution of A) and/or a solution of B) in an organic solvent, which are then mixed with the other components. The order of mixing components A), B) and C) is unimportant. The preparation of the solution can in many cases take place at room temperature with mechanical stirring; where appropriate, it takes place at elevated temperature.

Component D) ($R_F$ radical-containing, Si-free polymer or mixture of such polymers) which is present in compositions according to the invention can be used additionally to components A), B) and C) as early as in step a), either by mixing it in solvent-free form with components A), B) and C), or by adding it as a solution in an organic solvent to the mixture of A), B) and C). This organic solvent may be identical to component C).

If step a), on the other hand, is carried out without the use of component D), step c) must be followed by a step d) in which the aqueous dispersion obtained according to step c) is combined with an aqueous dispersion of component D). However, even if a component D) has already been used in step a), it is also possible to additionally carry out a step d), although this is not obligatory in this case. If a component D) is used both in step a) and also in step d), these two components D) may be identical to one another or different from one another with regard to their chemical structure.

The solution obtained according to step a) can either comprise in each case only a single compound which is covered by the definitions given below for components A), B) and C) and also D). Each of the components A), B), C) and D) can, however, independently of the nature of the other components, also be a mixture of compounds which is covered by the definition given for this component. This is thus also true for the polymers (component D) which contain perfluorinated radicals $R_F$ and are used in process step a) and/or d).

In a preferred embodiment of the compositions according to the invention, the solutions obtained after carrying out process step a) comprise components A), B) and C) in the following amounts:

0.2 to 50% by weight of A), preferably 2.5 to 20% by weight 10 to 85% by weight of B), preferably 30 to 50% by weight 10 to 85% by weight of C), preferably 40 to 60% by weight these values referring to the total amount of the solution, but not taking the optionally present component D) into consideration.

The above-mentioned preferred numerical values for the weight fractions are valid directly if no component D) has been used in process step a). Otherwise, they refer to the total weight of the solution obtained at step a) minus the amount of component D).

The solution obtained according to process step a) is dispersed in water in the subsequent step b). For this, the use of a dispersant or a mixture of dispersants is required. Expediently, the procedure in step b) involves firstly preparing a mixture of water and dispersant (dispersant mixture), and slowly stirring the solution obtained according to step a) into this mixture. During this operation, a dispersion arises at standard temperature or elevated temperature. For the purposes of better homogenization, it is possible, if necessary, to follow this by an additional mechanical homogenization, optionally under increased pressure.

For carrying out step b), nonionogenic dispersants are particularly suitable, such as, for example, alkylene oxide adducts of alcohols, fatty acids or amines. In many cases good results can also be achieved with cation-active dispersants, e.g. with quaternized ammonium salts or organic amines in acidic aqueous solution. Said classes of dispersants are best known as effective surfactants, inter alia also from the prior art in the case of silicone emulsions and in the case of fluoropolymer emulsions.

In process step c), the organic solvent (component C)) is removed. This can be carried out by distillation, optionally under reduced pressure.

In a preferred embodiment of compositions according to the invention, amounts of components A), B), dispersant and water are used such that the aqueous dispersion obtained after process step c) has been carried out comprises these ingredients in the following quantitative ratios:

0.1 to 20% by weight of A), preferably 0.3 to 8% by weight 4 to 60% by weight of B), preferably 15 to 35% by weight 0.5 to 20% by weight of dispersant or dispersant mixture, preferably 1 to 5% by weight 20 to 95% by weight of water, preferably 60 to 80% by weight these values referring to the total amount of the dispersion, but not taking the optionally present component D) into consideration.

As detailed above for the preferred weight fractions in the case of the solution obtained in step a), these preferred weight ratios refer in an analogous manner to the total weight of the dispersion minus the amount of optionally present component D).

If no component D) has been used in step a), step c) must then be followed by a step d). For this, the aqueous dispersion obtained according to step c) is combined in the last process step (step d) with a second aqueous dispersion. This second dispersion likewise comprises one or more dispersants. These dispersants may be the same as those used for step b), but may also be of a different nature. Said second aqueous dispersion comprises a polymer or a mixture of polymers which comprise one or more perfluorinated radicals ($R_F$) and which do not comprise silicon (component D)). The combining of the two aqueous dispersions can take place together with a mechanical homogenization. Preferably, amounts of products are used such that the composition according to the invention obtained after process step d) is an aqueous dispersion which comprises the individual constituents in the following quantitative ratios:

0.05 to 10% by weight of component A), preferably 0.15 to 4% by weight 2 to 30% by weight of component B), preferably 7.5 to 17.5% by weight 0.25 to 10% by weight of dispersant or dispersant mixture, preferably 0.5 to 2.5% by weight 10 to 60% by weight of water, preferably 20 to 50% by weight 10 to 85% by weight of $R_F$-containing polymer (component D), preferably 40 to 70% by weight.

These preferred values are preferred values for the compositions according to the invention also in cases where no step d) has been carried out because component D) has already been used in step a).

Component A) used for the preparation of compositions according to the invention is a polyorganosiloxane which is preferably liquid at 20° C. and standard pressure. The two end-groups of this polyorganosiloxane are formed by units of the formula $R^1R_2Si$—O— where $R^1$ and R have the meanings given below.

The polyorganosiloxane contains units of the formula

—Si(R)(R²)—O— in the chain, where the individual units of this formula can be distributed as desired over the polysiloxane chain. Preferably none of the radicals R and $R^2$ contains silicon atoms, meaning that component A) preferably contains no Si atoms in side chains.

All radicals R are, independently of one another, a linear or branched alkyl radical having 1 to 20 carbon atoms or the phenyl radical. 80 to 100% of all silicon atoms is preferably bonded in each case to at least one methyl group. Component A) satisfies the function of a soft hand agent. The radicals $R^1$ in formula (I) are, independently of one another, R, H or a radical of the formula —$(CH_2)_u$W or a monovalent aliphatic radical which contains one or more amino groups. Here, u is a number from 0 to 4, preferably 0 or 2 or 3. W is OH or OR, where R has the meaning already given. If one or more of the radicals $R^1$ is an aliphatic radical which contains amino groups, then radicals of the formula below and of formula (IV) given in claim 2 are preferred here. The radicals $R^1$ are preferably R, in particular $CH_3$. In formula (I), all of the radicals $R^2$ present are, independently of one another, hydrogen, a radical R of said type, or a radical $R^3$ or a radical X. All of the radicals $R^3$ present are either a linear or branched alkyl radical having 5 to 18 carbon atoms, where this alkyl radical is interrupted by an oxygen atom and/or where this alkyl radical is also modified such that two adjacent carbon atoms, together with an oxygen atom, form an epoxy group. One or more of the radicals $R^3$ can also be a linear or branched alkyl radical having 2 to 12 carbon atoms which carries a phenyl radical as substituent.

Preferably only a small proportion, i.e. 0 to 10%, of all of the radicals $R^2$ present are hydrogen. Particularly when component A) contains a radical X in which one or more hydroxyl groups and/or amino groups are present, preferably none of the radicals $R^2$ is hydrogen.

One or more of the radicals $R^2$ present may also be a radical X. X is a monovalent radical bonded to an Si atom which contains one or more amino groups and/or one or more hydroxyl groups as substituents. In particular, amino group-containing radicals X can give textiles finished with compositions according to the invention a very pleasant soft hand. A preferred embodiment of compositions according to the invention is therefore characterized in that, in component A), at least one of the radicals $R^2$ present is a radical X and that all radicals X present are chosen from radicals of the formula (II) to (VII)

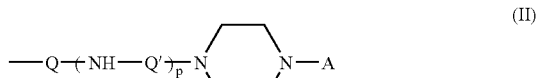
(II)

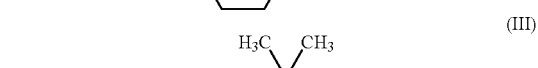
(III)

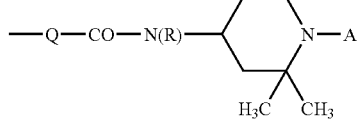

(IV)

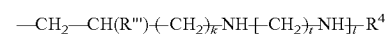
(V)

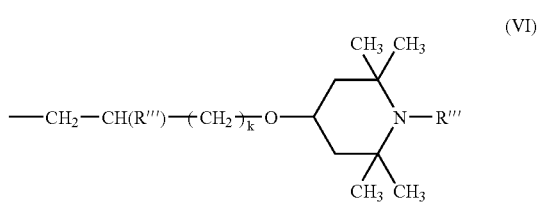
(VI)

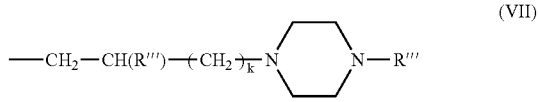
(VII)

where the nitrogen-containing radicals of these formulae may also be in quaternized form on one or more of the nitrogen atoms by means of an alkyl group having 1 to 8 carbon atoms, wherein R has the meaning given in claim 1, wherein R''' is H or $CH_3$, k is a number from 0 to 6, preferably 1, t is a number from 2 to 8, preferably 2 to 4, and l is a number from 0 to 3, preferably 0 or 1, and $R^4$ is H, —CO—$CH_3$, —CO—$(CH_2)_k$—OH, —$CH_2$—$(CH_2)_k$—$CH_3$ or the cyclohexyl radical, where A is hydrogen or an alkyl group having 1 to 4 carbon atoms, in which Q and Q' are in each case a divalent unbranched or branched alkylene radical having 1 to 4 carbon atoms, in which p=0 or 1 and in which all of the radicals Z present, independently of one another, are hydrogen, an alkyl radical having 1 to 6 carbon atoms and optionally having one or more hydroxyl groups as substituents, the cyclohexyl radical or the radical —CO—G, where G is an aliphatic radical having 1 to 6 carbon atoms which may have one or more hydroxyl groups as substituents.

It is particularly preferred if component A) contains at least one radical X of the formula (IV) or of the formula (V) in which Z is H R''' is H, $R^4$ is H and k is 1. Particularly suitable radicals X of the formula (IV) are —$(CH_2)_3NH_2$ and —$(CH_2)_3NH$—$(CH_2)_2NH_2$.

A preferred embodiment of compositions according to the invention is characterized in that, in component A), the ratio m:n has a value in the range from 0.5:1 to 50:1, where m is the number of silicon atoms to which no radical X and no radical $R^3$ is bonded, and n is the number of silicon atoms to which a radical X or a radical $R^3$ is bonded.

In determining said ratio m:n, the sum of all silicon atoms which are present in units —Si(R)(X)—O— or in units —Si(R)($R^3$)—O— is the number n. The sum of all other silicon atoms is the number m.

Component A) used for the preparation of compositions according to the invention may thus be a polyorganosiloxane in which only alkyl groups are bonded to all —Si—O units, e.g. a polydimethylsiloxane. Preference is, however, given to using polyorganosiloxanes in which at least one amino group is present in the form of a radical X.

Suitable polysiloxanes are available commercially, e.g. from Wacker Chemie GmbH and Dow Corning. The product "Silicone Oil L 080" from Wacker is highly suitable. In addition, products suitable as component A) and the preparation thereof are described in the specialist literature, e.g. in EP-A 342 830, EP-A 342 834, EP-A 491 659, EP-A 659 930, U.S. Pat. No. 4,366,001, EP-A 978 586, U.S. Pat. No. 4,620,878, EP-A 441 530.

If component A) contains radicals X with amino groups, then one or more of these amino groups may also be present in quaternized form. In this case, 4 carbon atoms are bonded in each case to one or more nitrogen atoms. The anions corresponding to the quaternized groups are preferably chosen from chloride anions, methylsulfate anions, benzenesulfonate anions, alkylarylsulfonate anions and carboxylate anions. The carboxylate anions are preferably anions of monocarboxylic acids having 1 to 4 carbon atoms; the alkylarylsulfonate anions are preferably anions of toluenesulfonic acids, but may also be anions of sulfonic acids of alkylphenol ethoxylates.

Component B) used for the preparation of the compositions according to the invention is a fluorine-free diisocyanate or polyisocyanate whose NCO groups are 80 to 100% blocked. Preferably all isocyanate groups present are blocked, i.e. the degree of blocking is preferably 100%. Blocking agents for isocyanate groups are known from the literature. They form adducts with NCO groups which, at elevated temperature, e.g. from about 100° C., are reversibly cleaved and again form free isocyanate groups. Component B) acts in compositions according to the invention as an extender which enhances the action of fluoropolymers. The use of an extender makes it possible to achieve the same level of oil/water repellency of finished textiles using considerably smaller amounts of fluoropolymer than without extender.

Suitable blocking agents for isocyanate groups are, inter alia, dimethylpyrazole, diacetyl, caprolactam, unsubstituted or substituted phenols, and metal hydrogensulfites. Preferred blocking agents for component B) in compositions according to the invention are alkali metal hydrogensulfites and ketone oximes, in particular acetone oxime, butanone oxime (methyl ethyl ketone oxime) and methyl isobutyl ketone oxime.

The products which can be used as component B) may be compounds with more than 3 blocked isocyanate groups. Preference is, however, given to using di- and triisocyanates where 80 to 100% of the —NCO groups present must be blocked. Mixtures which comprise two or more diisocyanates and/or two or more triisocyanates with blocked NCO groups are also highly suitable.

The di- or polyisocyanates with blocked isocyanate groups which are suitable as component B) may also be polymers, in particular polyurethanes which have blocked isocyanate groups. Such polyurethanes may be obtained by reacting polyfunctional isocyanates with polyhydric alcohols using an excess of isocyanate groups relative to alcoholic OH groups and subsequently blocking the free isocyanate groups which are present in the polyurethane. One example of such a polyurethane is a product which can be obtained starting from DESMODUR L75 from Bayer by blocking free isocyanate groups. Another example is the polyurethane, present in the product BAYGARD EDW from Bayer, based on an aromatic diisocyanate and a polyhydric aliphatic alcohol whose isocyanate groups are blocked with ketone oxime. Also suitable is a polyurethane which can be obtained by reacting an excess of diphenylmethane 4,4'-diisocyanate with a mixture of mono-, di- and tripropylene glycol, then further reacting with 1,1,1-trimethylolpropane and N-methyldiethanolamine and blocking the free NCO groups with butanone oxime. Also suitable are polyurethanes obtained by reacting an excess of a diisocyanate or diisocyanate mixture of the formula (VIII) given below with a diol or diol mixture and subsequently blocking the free isocyanate groups. Preferred embodiments of compositions according to the invention are characterized in that component B) is obtainable by reacting a di- or triisocyanate of the formula (VIII)

$$OCN-R^5-NCO \quad (VIII)$$

with a di- or trihydric aliphatic or cycloaliphatic alcohol having 2 to 12 carbon atoms, this reaction being carried out such that the resulting product still contains free isocyanate groups and that 80 to 100% of these isocyanate groups are then blocked, where $R^5$ has the meaning given in claim 8.

In a further preferred embodiment of compositions according to the invention, component B) is chosen from compounds of the formula (VIII)

$$OCN-R^5-NCO \quad \text{(VIII)}$$

where $R^5$ is a divalent aliphatic radical having 3 to 12 carbon atoms, a cycloaliphatic radical having 6 to 40 carbon atoms or a divalent aromatic radical having 1 or 2 aromatic benzene-derived rings, where, in the radical $R^5$, a CH bond may be replaced by a C—NCO bond, where 80 to 100% of the isocyanate groups present in the compound of the formula (VIII) are blocked.

Products (extenders) suitable as component B) are also described in EP-A 1 013 687 and in EP-A 196 309, EP-A 537 578 and EP-A 872 503.

The aliphatic or cycloaliphatic radical which may be $R^5$ in formula (VIII) may be linear or branched. Suitable diisocyanates for the preparation of component B) are, for example, hexamethylene 1,6-diisocyanate, trimethylhexamethylene 1,6-diisocyanate (isomer mixture) or DDI 1410-diisocyanate (manufacturer Henkel, USA), DDI 1410-diisocyanate is a cyclohexane derivative in which a longer alkyl radical is in each case bonded to 4 ring carbon atoms. Two of these longer-chain alkyl radicals each carry a terminal —NCO group. DDI 1410 diisocyanate has a total of 38 carbon atoms. Preferred diisocyanates of the formula (VIII) are those in which $R^5$ is an open-chain aliphatic, branched or unbranched radical having 4 to 10 carbon atoms, a cycloaliphatic radical having 6–40 carbon atoms or a divalent aromatic radical of the type mentioned below. Of the cycloaliphatic diisocyanates preference is given to unsubstituted cyclohexane 1,4-diisocyanate, cyclohexane 1,4-diisocyanate substituted by one or more alkyl groups, or a cyclohexane substituted by alkyl groups in which, in each case, —NCO groups are present on the end of two of these alkyl groups.

If $R^5$ in formula (VIII) is a divalent aromatic radical, this radical contains one or two aromatic benzene-derived carbon rings, $R^5$ in this case is preferably a radical of the formula —C$_6$H$_3$(R$^9$)— or of the formula

—C$_6$H$_3$(R$^9$)—CR$^9{}_2$—C$_6$H$_3$(R$^9$)— here, C$_6$H$_3$ is a trivalent benzene-derived radical. One of these 3 free valences is bonded to the radical $R^9$, where $R^9$ is hydrogen or a methyl group. The two other free valences on the radical C$_6$H$_3$ are preferably in the para position relative to one another, i.e. the blocked isocyanate groups are preferably arranged in the para position relative to one another. Of these aromatic blocked isocyanates, preference is given to tolylene diisocyanates with blocked NCO groups, mixtures of isomers thereof also being highly suitable. From all of said diisocyanates are derived triisocyanates if a C—H bond is replaced by a NCO bond. These triisocyanates are also suitable as component B) of compositions according to the invention if 80 to 100% of the NCO groups are present in blocked form.

The text below gives examples of isocyanates which are readily suitable as component B) provided 80 to 100% of the NCO groups are in blocked form, otherwise this blocking must still be carried out before the corresponding product can be used as component B).

DDI 1410 diisocyanate (Henkel Corp. USA), this product is a cyclohexane derivative with two isocyanate groups and a total of 38 carbon atoms; VESTANAT IPDI, likewise a cyclohexane derivative with two NCO groups; VESTANAT TMDI, an open-chain, branched aliphatic diisocyanate; VESTANAT B 370; isophorone diisocyanates; toluene and xylene derivatives with 2 or 3 isocyanate groups, in particular toluene 2,4- and 2,6-diisocyanate; diisocyanates of diphenylmethane, in particular 4,4'-diisocyanate; DESMODUR L 75 (Bayer) an isocyanate-containing polymer of diisocyanate and diol. Further compounds which contain isocyanate groups and are suitable as component B) (where necessary after blocking the —NCO groups) are described in U.S. Pat. No. 4,834,764, EP-A 1 013 687, EP-A 872 503 and EP-A 537 578.

The organic solvent (component C)) used in process step a) has a boiling point in the range between 30° C. and 200° C. at atmospheric pressure. It is essentially insoluble in or immiscible with water. It must not react chemically with component A) and component B) and component D) if such a component is used in step a), and in particular it does not contain any OH groups. Suitable as component C) are cyclic or acyclic aliphatic hydrocarbons which are unsubstituted or substituted by one or more halogen atoms. Particularly preferred as component C) are benzene, toluene, xylene, ketones having 3 to 16 carbon atoms, esters of aliphatic monocarboxylic acids and aliphatic monoalcohols.

The aqueous dispersion which is combined, in process step d), with the aqueous dispersion which has been obtained according to process step c) comprises, as component D), a polymer or a mixture of polymers. The definition given below for component D) also applies for the case when a component D) has already been used in step a), it being necessary for component D) to be anhydrous if it is used in step a). All of these polymers which form component D) contain one or more perfluorinated radicals $R_F$, where $R_F$ preferably has the following meaning:

$$R_F = CF_3-(CF_2)_a-$$

where a is a number from 3 to 25. The $R_F$-containing polymers are free from silicon atoms. They are the reason that an oil-repelling action of the textiles finished therewith is achieved with compositions according to the invention which comprise such polymers.

The perfluorinated radical $R_F$ preferably has 6 to 20 carbon atoms, i.e. in the abovementioned formula, a preferably has a value from 5 to 19. The value of a is normally an average value which gives the average content of $CF_2$ groups in the polymer, which is normally a mixture of molecules whose individual representatives differ by virtue of the value of a.

This statement, according to which the perfluorinated radical $R_F$ preferably contains 6 to 20 carbon atoms, i.e. 5 to 19 $CF_2$ groups, is also valid for all of the preferred $R_F$-group-containing polymers described below.

The perfluorinated radical $R_F$, which must be present in the polymers which are used in process step d) is, as stated above, preferably a linear, aliphatic perfluoroalkyl radical. In addition to a terminal $CF_3$ group, it preferably has at least 5 $CF_2$ groups bonded thereto. In individual cases, the radical $R_F$ may also be a nonlinear perfluoroalkyl radical; however, in this case too, at least 6 perfluorinated carbon atoms should be present in order to achieve the required level of oil-repelling action on finished textiles.

In a preferred embodiment of compositions according to the invention, the $R_F$-containing polymer (component D)

used in process step a) and/or d) is chosen from the group of polyurethanes, polyesters and polyacrylates which contain one or more radicals $R_F$. Aqueous dispersions of mixtures of such polymers can also be used in process step d). In addition, these polymers may also be copolymers which additionally contain monomer building blocks. Thus, for example, it is possible to use copolymers which are constructed from monomer building blocks of the formula (XI) described below and other monomers copolymerizable therewith, such as, for example, vinyl compounds such as vinyl chloride.

Aqueous dispersions which comprise polymers with $R_F$ radicals and can be used in process step d) for the preparation of compositions according to the invention, and the parent polymers themselves and their preparation are known to the person skilled in the art. Suitable polymers are described, for example, in U.S. Pat. No. 4,054,592, EP-A 314 944, U.S. Pat. No. 3,356,628, U.S. Pat. No. 3,528,849, U.S. Pat. No. 3,968,066, U.S. Pat. No. 3,896,251, EP-A 73 364, EP-A 348 350, U.S. Pat. No. 3,478,116, U.S. Pat. No. 4,742,140.

In a preferred embodiment of compositions according to the invention, in process step d), an aqueous dispersion is used which comprises, as $R_F$-group-containing polymer, a polyurethane obtainable by reacting a diisocyanate or triisocyanate of the formula (VIII)

$$OCN-R^5-NCO \quad\quad (VIII)$$

or a mixture of such isocyanates, with a dihydric or trihydric alcohol which contains one or more radicals $R_F$, or with a mixture of such alcohols, where $R^5$ has the meaning given in claim 8 and $R_F$ has the meaning given in claim 11, where in cases when the reaction product still has isocyanate groups, these isocyanate groups are then blocked.

The dihydric or trihydric alcohol reacted with isocyanate or isocyanate mixture of the formula (VII) is preferably chosen from alcohols of the formulae (IX) and (X)

$$[R_F-(CH_2)_b-(Y-CH_2)_c]_2C(CH_2OH)_2 \quad\quad (IX)$$

$$HO-CH_2-CR^6R^7-(Y)_d-CR^6R^7-CH_2OH \quad\quad (X)$$

where all of the radicals $R^6$, independently of one another, are hydrogen or an alkyl radical having 1 to 4 carbon atoms, b is a number from 1 to 4, c is 0 or 1, d is 0 or 1, $R_F$ is $CF_3-(CF_2)_a$, a has the meaning given in claim 11, $R^7$ is $-(CH_2)_b-R_F$ if d=1, and is $-Y-(CH_2)_b-R_F$, if d=0 and Y is $-O-$, $-S-$, $-NR-$ or $-PR-$, preferably $-S-$.

If a mixture of alcohols is used for the reaction with diisocyanates/triisocyanates of the formula (VIII), then the individual compounds of this mixture are preferably likewise compounds of the formula (IX) or (X).

In cases where the $R_F$-group-containing polymer is a polyurethane which forms by the reaction of a diisocyanate or mixture of diisocyanates with a dihydric or trihydric alcohol or a mixture of such alcohols, then a preferred embodiment of compositions according to the invention is characterized in that the $R_F$-group-containing polymer is obtainable by reacting alcohol or alcohol mixture with diisocyanate or diisocyanate mixture in a ratio such that, per mole of alcoholic OH group, 0.9 to 1.1 mol of $-NCO$ groups are used and that all isocyanate groups which are still present after the reaction are blocked with a ketone oxime, preferably butanone oxime, acetone oxime or methyl isobutyl ketone oxime.

If a slight excess of NCO groups is used here relative to OH groups and thus the resulting polymer still contains free NCO groups, then it is advantageous to block these. Suitable blocking agents are the compounds given above in connection with component B), and preference is given to using ketone oximes, in particular butanone oxime (methyl ethyl ketone oxime), acetone oxime or methyl isobutyl ketone oxime.

A further group of $R_F$-radical-containing polymers which can be used advantageously in process step d) in the form of an aqueous dispersion are $R_F$-group-containing polyacrylates. Esters of polyacrylic acid which have a perfluorinated radical $R_F$ in the alcohol component are particularly suitable. A preferred embodiment of compositions according to the invention thus consists in the aqueous dispersion used in process step d) comprising, as $R_F$-radical-containing polymer, a polyacrylate which contains, as monomer building block, a compound of the formula (XI)

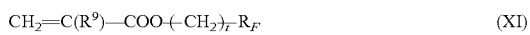
$$CH_2=C(R^9)-COO-(CH_2)_t-R_F \quad\quad (XI)$$

in which $R^9$ is hydrogen or a methyl group, t is a number from 2 to 8 and $R_F$ has the meaning given in claim 11, where this polymer may be a copolymer which may contain further vinylically unsaturated compounds as monomer building blocks.

Further vinylically unsaturated monomer building blocks which may contain said $R_F$-containing polyacrylate are, for example, vinyl or vinylidene halides, in particular chlorides, or vinyl esters of aliphatic carboxylic acids.

The $R_F$-containing acrylate homo- or copolymers can be obtained by known methods starting from commercially available $R_F$-containing alcohols by esterification and subsequent free-radical polymerization.

The third group of polymers which, in addition to $R_F$-radical-containing polyurethanes or polyacrylates, are particularly suitable for being used in the form of aqueous dispersions in process step d) are $R_F$-radical-containing polyesters, in particular polyesters which can be prepared from fluorine-free dicarboxylic acids and $R_F$-radical-containing dihydric alcohols. A preferred embodiment of compositions according to the invention is therefore characterized in that the $R_F$-group-containing polymer used is a polyester obtainable by reacting a dicarboxylic acid or a mixture of dicarboxylic acids of the formula (XII)

$$HOOC-(CHR^{10})_r-COOH \quad\quad (XII)$$

with an alcohol or a mixture of alcohols of the formulae (IX) and/or (X), where $R^{10}$ is hydrogen or an alkyl radical having 1 to 4 carbon atoms, r is a number from 2 to 10, preferably from 2 to 6, and the formulae (IX) and (X) have the meanings given in claim 13.

The esterification of the dicarboxylic acid or of the dicarboxylic acid mixture with the alcohol or alcohol mixture can be carried out by generally known methods, e.g. under acidic catalysis. The components are preferably reacted here in a ratio such that, per mole of —COOH groups, a total of 0.9 to 1.1 mol of alcoholic OH groups are used.

It has already been mentioned that the same dispersants or different dispersants may be present in the aqueous dispersion of the $R_F$-radical-containing polymer as in the aqueous dispersion of polysiloxane (component A)) and blocked isocyanate (component B)) which has been obtained according to process step c). The dispersants in the $R_F$-polymer-containing aqueous dispersion are preferably chosen so that said dispersion has good stability. In some instances, therefore, the optimum dispersants for this dispersion may be dependent on whether the polymer is a $R_F$-radical-containing polyurethane, a polyacrylate or a polyester. Suitable dispersants for these polymers are known from the specialist literature; preference is given to using nonionogenic or cationic dispersants for the preparation of compositions according to the invention.

All said preferred $R_F$-containing polymers, namely $R_F$-polyurethanes, $R_F$-polyacrylates and $R_F$-polyesters, can also advantageously be used in anhydrous form in process step a), i.e. as such or dissolved in an organic solvent which corresponds to the definition of component C).

Compositions according to the invention which are in the form of aqueous dispersions can be used very readily for the treatment of fiber materials, in particular for the treatment of fabrics in the form of wovens or knits. In this connection, the compositions may comprise further ingredients known from textile finishing, such as modified polyolefin waxes, flame retardants, or cellulose crosslinkers. These optional additional ingredients are added to the compositions according to the invention preferably only after process step d) have been carried out.

The application of compositions according to the invention to the fiber materials can be carried out by known methods, e.g. by padding. Here, the aqueous liquor used for the padding is usually adjusted to the desired concentration and, where necessary, to the desired pH. The application of compositions according to the invention to the textiles can move within the framework known from textile finishing. After padding, the fiber materials are dried and, where appropriate, cured in a known manner at elevated temperature.

The fiber materials which are treated with compositions according to the invention are preferably fabrics in the form of wovens or knits. They can consist of cellulose, e.g. cotton, of synthetic fibers or of mixtures of cellulose or of wool with synthetic fibers. Suitable synthetic fibers are primarily polyesters, polyamides or acrylic polymers. The finished fabrics can be used for the manufacture of articles of clothing, such as sportswear or rainwear.

With the help of compositions according to the invention, very pleasant soft hand and excellent oil- and water-repelling properties are imparted to the textiles. The addition of the polysiloxane has an adverse effect here on the favorable properties achieved by $R_F$ polymers to a much lower degree than in the case of compositions from the prior art which comprise silicone, extender and fluoropolymer. The permanence of the properties of the textile obtained with compositions according to the invention is excellent.

The invention will be illustrated below by working examples.

EXAMPLE 1

Preparation of a Dispersion According to the Invention

Step a):

A solution was prepared from 125 g of a 60% strength solution of a cycloaliphatic polyisocyanate with blocked NCO groups in n-butyl acetate/xylene (3:5) (VESTANAT B 1370, Servo)=(component B))

62.5 g of methyl isobutyl ketone (=component C))

7.5 g of a polydiorganosiloxane (=component A)).

The polydiorganosiloxane used (ÖL L 080, Wacker, DE) had, at both chain ends, $(CH_3)_3Si$—O— units and, within the chain, side chains with epoxy functions, with longer-chain alkyl groups and with phenyl groups which were each bonded via an alkylene group to one Si atom. In addition, it contained a small fraction of $Si(CH_3)(H)$—O units in the chain.

Step b):

The following products were mixed together by stirring at room temperature.

1.3 g of a cation-active dispersant (ETHOQUAD HT 25, AKZO-Nobel)

0.6 g of an ethoxylated $C_{10-12}$-alcohol (6 EO)

19.3 g of propylene glycol 3.3 g of an alkyldimethylamine oxide (REWOMINOX L 408, WITCO)

8 g of a reaction product of bisphenol A diglycidyl ether and hexamethylenediamine (as acetate)

270 g of water

The solution obtained according to step a) was added to this aqueous dispersant mixture in portions with mechanical homogenization at room temperature. The pH was then adjusted to about 6.0 using concentrated hydrochloric acid. This gave a stable bluish dispersion.

Step c):

583 g of the dispersion obtained according to step b) was subjected to distillation at a bath temperature of 70° C. and a reduced pressure of from 420 to 250 mbar. This gave 284 g of a dispersion. Its concentration was adjusted to 30% by weight with water.

Step d):

13.3 g of an aqueous dispersion of a polymer with perfluoroalkyl ($R_F$) groups were added to 5.6 g of the dispersion obtained according to step c).

This dispersion of the $R_F$ polymer comprised about 30% by weight of a copolymer of an alkyl acrylate (with $R_F$ groups on the end of the alkyl chain), stearyl methacrylate, methyl methacrylate and hydroxyethyl methacrylate (weight ratio of said monomers 70:18:4:1), 10% by weight of dipropylene glycol, 57% by weight of water and 3% by weight of dispersant.

This gave a stable aqueous dispersion (="dispersion 1" according to the invention).

EXAMPLE 2

Comparative Example not in Accordance with the Invention

The dispersion (="comparative dispersion 2") of this example was prepared by the process of the prior art (components A) and B) were not dispersed together in water, but separately).

125 g of extender (component B, as in example 1) and 62.5 g of methyl isobutyl ketone (component C) as in example 1) were mixed together at room temperature.

This mixture was added, with mechanical homogenization, to an aqueous dispersant mixture which was the same as that in step b) of example 1 except that it did not comprise the 0.6 g of ethoxylated alcohol.

The pH was then adjusted to 6.0 as in example 1.581 g of the resulting bluish stable dispersion were subjected to distillation as given in step c) of example 1).

This gave 243 g of a dispersion, the concentration of which was adjusted to a value of 30% by weight with water.

0.4 g of an aqueous dispersion which comprised 35% by weight of the same polysiloxane as used in step a) of example 1 (as component A)) were added to 5.2 g of the resulting dispersion. In addition, this 0.4 g of dispersion comprised 3% by weight of the ethoxylated $C_{10-12}$ of alcohol from step b) of example 1.

The resulting 5.6 g of aqueous dispersion were combined with 13.3 g of the same aqueous dispersion of an $R_F$ group-containing polymer as used in step d) of example 1. This gave a stable aqueous dispersion (="comparative dispersion 2")

EXAMPLE 3

According to the Invention

Example 1 is repeated with the following changes

Step a):

223 g of DESMODUR L 75 (Bayer) instead of VESTANAT B 1370

361 g of methyl isobutyl ketone 91.7 g of methyl isobutyl ketone oxime (to block the NCO groups of the DESMODUR)

12.8 g of polysiloxane (ÖL L 080) (see example 1)

Step b)

4.8 g of ETHOQUAD HT 25 instead of 1.3 g 9 g of reaction product of Bisphenol A diglycidyl ether and hexamethylenediamine instead of 8 g 54 g of propylene glycol instead of 19.3 g 632 g of water instead of 270 g additionally, the aqueous dispersant mixture also comprised 13.5 g of ethoxylated castor oil (about 36 EO)

pH was adjusted to 4.5

Step c)

Pressure 370–200 mbar 747 g of dispersion were obtained which were adjusted to a concentration of 30% by weight.

In step d), 13.3 g of the same aqueous fluoropolymer dispersion as in example 1 were added to 5.6 g of this dispersion.

This gave a stable aqueous dispersion.

EXAMPLE 4

Finishing Experiments

Various cotton fabrics, including batiste and "stella" (a $NH_3$-pretreated quality) were treated with "dispersion 1" according to the invention and "comparative dispersion 2". The treatment liquors in each case comprised, per 1 of liquor, 18.9 g of dispersion 1 or comparison dispersion 2, and also 1 ml of 60% strength acetic acid, 11 g of a commercially available cellulose crosslinker based on N,N'-dimethyloldihydroxyethyleneurea and 6 g of Mg chloride hydrate (crosslinking catalyst). The dispersions were applied to the fabric by means of padding (liquor uptake about 90% by weight). The fabrics were then dried for 10 minutes at 110° C. and cured for 5 minutes at 150° C.

After this treatment, all of the fabrics had a pleasant soft hand. By contrast, corresponding fabric qualities which had been treated in comparative experiments only with fluoropolymers and/or with extenders (component B)), i.e. without the use of polysiloxane, had a considerably harsher hand.

Oil- and water-repelling action were determined in each case on the fabric samples both directly after curing and conditioning, and also after washing 5 times at 60° C. (domestic washing machine, surfactant-containing wash liquor), and also after treatment with haloolefin (simulation of dry cleaning).

To assess the results, the test methods described below were used. Prior to carrying out the tests, the fabric samples were stored after finishing for 24 hours at 20° C./65% relative humidity.

The oil-repelling action was determined in accordance with AATCC 118-1997 (corresponding to ISO 14419). For this, the wetting by 8 different liquid hydrocarbons was tested; the evaluation scale of this test method comprised grades, a higher grade corresponding to a better repelling effect.

The water-repelling action was carried out both in accordance with AATCC 22-1996 ("spray test") (corresponding to ISO 4920), and also in accordance with DIN 53888 ("Bundesmann rain test"). In this latter test, the "bead-off effect" is assessed visually (three times for each fabric, after a rain time of 1, 5 and 10 minutes), grades from 1 (poorest grade) to 5 (best grade: water beads off without wetting) being awarded, and then the water absorption in % by weight is determined (higher value indicates poorer water repellency). In the spray test, the wetting is likewise assessed visually, the scale of grades ranging from 0 to 100 (100=best grade, i,e. least wetting). The abovementioned AATCC test methods are given in the "AATCC (American Association of Textile Chemists and Colorists) Technical Manual".

The results obtained are given in tables 1 and 2 below. It is clear that the results obtained with the dispersion 1 according to the invention are better than those obtained with comparison dispersion 2.

TABLE 1

| (Results on batiste fabric) | Dispersion 1 | Comparison dispersion 2 |
|---|---|---|
| a) after padding and curing | | |
| Oil repellency, grade | 6 | 5 |
| Spray test, grades | 100/100/100 | 80/80/70 |
| Bead-off grades | 5/4/4 | 2/2/2 |
| Water absorption (% by wt.) | 20.0 | 34.2 |
| b) after 5 washes at 60° C. | | |
| Oil repellency, grade | 5 | 4 |
| Spray test, grades | 90/90/90 | 90/90/90 |
| Bead-off grades | 4/3/3 | 3/3/3 |
| Water absorption (% by wt.) | 21.5 | 22.9 |
| c) after "dry cleaning" | | |
| Oil repellency, grade | 5 | 5 |
| Spray test, grades | 100/100/100 | 100/100/90 |
| Bead-off grades | 5/4/4 | 5/3/3 |
| Water absorption (% by wt.) | 19.9 | 22.1 |

TABLE 2

| (Results on stella fabric) | Dispersion 1 | Comparison dispersion 2 |
|---|---|---|
| a) after padding and curing | | |
| Oil repellency, grade | 5 | 5 |
| Spray test, grades | 100/100/100 | 70/50/50 |
| Bead-off grades | 5/4/4 | 2/2/1 |
| Water absorption (% by wt.) | 25.6 | 45.7 |
| b) after 5 washes at 60° C. | | |
| Oil repellency, grade | 5 | 4 |
| Spray test, grades | 90/90/90 | 90/90/90 |
| Bead-off grades | 4/4/4 | 3/3/3 |
| Water absorption (% by wt.) | 25.6 | 31.5 |
| c) after "dry cleaning" | | |
| Oil repellency, grade | 5 | 5 |
| Spray test, grades | 100/100/100 | 100/90/90 |
| Bead-off grades | 5/4/4 | 4/3/3 |
| Water absorption (% by wt.) | 22.7 | 25.9 |

Further compositions according to the invention were prepared using different polysiloxanes (component A)) analogously to example 1 above. These polysiloxanes contained sterically hindered amino functional radicals, as expressed above in the description text and in the claims by the formulae (III) and/or (VI).

The use of these polysiloxanes also gave results which were as good as those in the case of example 1.

What is claimed is:

1. A process for manufacturing aqueous dispersions comprising the following successive process steps:
   a) preparing an anhydrous solution which comprises the components A), B) and C) and optionally a component D),
   b) dispersing the solution obtained according to step a) in water using a dispersant or a mixture of dispersants,
   c) removing component C),
   d) optionally combining the dispersion obtained according to process step c) with an aqueous dispersion which comprises a component D), where, at least for the case where the solution prepared in step a) does not comprise a component D), a process step d) is then carried out after step c), where component A) is a polyorganosiloxane whose end-groups are formed by units of the formula

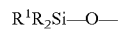

and which contains units of the formula

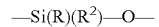

in the chain, where the individual units —Si(R)(R$^2$)—O— may be distributed arbitrarily over the polysiloxane chain, where all radicals R, independently of one another, are a linear or branched alkyl radical having 1 to 20 carbon atoms or the phenyl radical, all radicals R$^1$, independently of one another, are R, H, (CH$_2$)$_u$ W or are a monovalent aliphatic radical which contains one or more amino groups, where u is a number from 0 to 4 and W is OH or OR, where all of the radicals R$^2$ present, independently of one another, are H, R, R$^3$ or X, where R$^3$ is an alkyl radical having 5 to 18 carbon atoms which is interrupted by an oxygen atom and/or in which two adjacent carbon atoms form an epoxy group together with an oxygen atom, or where R$^3$ is an alkyl radical having 2 to 12 carbon atoms which carries a phenyl radical as substituent, and where X is a monovalent hydrocarbon radical which contains one or more amino groups and/or one or more hydroxyl groups as substituents, where part or all of the amino groups present are optionally in quaternized form, where component B) is a fluorine-free diisocyanate or polyisocyanate whose NCO groups are 80 to 100% blocked, where component C) is a water-insoluble organic solvent which does not contain any OH groups and whose boiling point at atmospheric pressure is between 30° C. and 200° C. and where component D) is a polymer which contains one or more perfluorinated radicals (R$_F$) and no silicon, or where component D) is a mixture of such polymers.

2. A process as claimed in claim 1, wherein, in component A), at least one of the radicals R$^2$ present is a radical X and that all of the radicals X present are chosen from the radicals of the formula (II) to (VII)

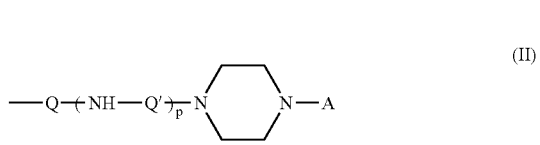

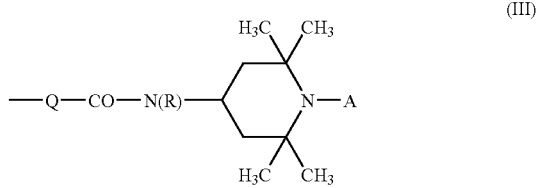

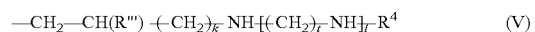

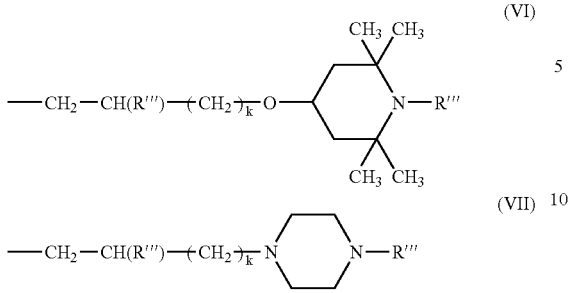

where the nitrogen-containing radicals of these formulae may also be in quaternized form on one or more of the nitrogen atoms by means of an alkyl group having 1 to 8 carbon atoms, wherein R has the meaning given in claim 1,
wherein R''' is H or $CH_3$,
k is a number from 0 to 6,
t is a number from 2 to 8,
and
l is a number from 0 to 3,
and
$R^4$ is H, —CO—$CH_3$, —CO($CH_2$)$_k$OH, —$CH_2$($CH_2$)$_k$ $CH_3$ or the cyclohexyl radical, where A is hydrogen or an alkyl group having 1 to 4 carbon atoms, in which Q and Q' are in each case a divalent unbranched or branched alkylene radical having 1 to 4 carbon atoms, in which p=0 or 1 and in which all of the radicals Z present, independently of one another, are hydrogen, an alkyl radical having 1 to 6 carbon atoms and optionally having one or more hydroxyl groups as substituents, the cyclohexyl radical or the radical —CO—G, where G is an aliphatic radical having 1 to 6 carbon atoms which may have one or more hydroxyl groups as substituents.

3. A process as claimed in claim 2, wherein component A) contains at least one radical X of the formula (IV) or of the formula (V), where Z is H, R''' is H, $R^4$ is H and k is 1.

4. A process as claimed in claim 1, wherein, in component A), at least one methyl group is bonded in each case to 80 to 100% of all of the silicon atoms present.

5. A process as claimed in claim 1, wherein, in component A), the ratio m:n has a value in the range from 0.5:1 to 50:1, where m is the number of silicon atoms to which no radical X and no radical $R^3$ is bonded, and n is the number of silicon atoms to which a radical X or a radical $R^3$ is bonded.

6. A process as claimed in claim 1, wherein component B) is a diisocyanate or a triisocyanate with blocked NCO groups.

7. A process as claimed in claim 1, wherein, in component B), 80 to 100% of the isocyanate groups are blocked with an alkali metal hydrogensulfite or with a ketone oxime.

8. A process as claimed in claim 7, wherein the ketone oxime is acetone oxime, butanone oxime or methyl isobutyl ketone oxime.

9. A process as claimed in claim 1, wherein component B) is chosen from compounds of the formula (VIII)

$$OCN—R^5—NCO \quad (VIII)$$

where $R^5$ is a divalent aliphatic radical having 3 to 12 carbon atoms, a cycloaliphatic radical having 6 to 40 carbon atoms or a divalent aromatic radical having one or two aromatic, benzene-derived rings, where, in the radical $R^5$, a CH bond may be replaced by a C—NCO bond, where 80 to 100% of the isocyanate groups present in the compound of the formula (VIII) are blocked.

10. A process as claimed in claim 1, wherein component B) is obtained by reacting a di- or triisocyanate of the formula (VIII)

$$OCN—R^5—NCO \quad (VIII)$$

with a di- or trihydric aliphatic or cycloaliphatic alcohol having 2 to 12 carbon atoms, this reaction being carried out such that the resulting product still contains free isocyanate groups and that 80 to 100% of these isocyanate groups are then blocked, where $R^5$ is a divalent aliphatic radical having 3 to 12 carbon atoms, a cycloaliphatic radical having 6 to 40 carbon atoms or a divalent aromatic radical having one or two aromatic, benzene-derived rings, where, in the radical $R^5$, a CH bond may be replaced by a C—NCO bond.

11. A process as claimed in claim 1, wherein the organic solvent (component C) is selected from the group consisting of benzene, toluene, xylene, ketones having 3 to 16 carbon atoms, esters of aliphatic monocarboxylic acids and aliphatic monoalcohols.

12. A process as claimed in claim 1, wherein the $R_F$-group-containing polymer is selected from the group consisting of polyurethanes, polyesters and polyacrylates which contain one or more radicals $R_F$, where $R_F$ is a monovalent radical of the formula $$CF_3(CF_2)_a$$

and a is a number from 3 to 25.

13. A process as claimed in claim 1, wherein the $R_F$-group-containing polymer used is a polyurethane obtained by reacting a diisocyanate or triisocyanate of the formula (VIII)

$$OCN—R^5—NCO \quad (VIII)$$

or a mixture of such isocyanates,
with a dihydric or trihydric alcohol which contains one or more radicals $R_F$, or with a mixture of such alcohols,
where $R^5$ is a divalent aliphatic radical having 3 to 12 carbon atoms, a cycloaliphatic radical having 6 to 40 carbon atoms or a divalent aromatic radical having one or two aromatic, benzene-derived rings,
where, in the radical $R^5$, a CH bond may be replaced by a C—NCO bond and $R_F$ is a monovalent radical of the formula $$CF_3(CF_2)_a$$

and a is a number from 3 to 25, where for the case when the reaction product still has isocyanate groups, these isocyanate groups are then blocked.

14. A process as claimed in claim 13, wherein the dihydric or trihydric alcohol which is reacted with the isocyanate of the formula (VIII) is chosen from alcohols of the formulae (IX) and (X)

$$[R_F(CH_2)_b(Y—CH_2)_c]_2C(CH_2OH)_2 \quad (IX)$$

$$HO—CH_2—CR^6R^7(Y)_dCR^6R^7—CH_2OH \quad (X)$$

where all of the radicals $R^6$, independently of one another, are hydrogen or an alkyl radical having 1 to 4 carbon atoms,
b is a number from 1 to 4,
c is 0 or 1,
d is 0 or 1, $R_F$ is $CF_3(CF_2)_a$, a is a number from 3 to 25, $R^7$ is $—(CH_2)_b R_F$ if d=1, and is $—Y(CH_2)_b R_F$, if d=0 and Y is —O—, —S—, —NR— or —PR—.

15. A process as claimed in claim 13, wherein the $R_F$-group-containing polymer is obtained by reacting the alcohol or alcohol mixture with the diisocyanate or diisocyanate mixture in a ratio such that, per mole of alcoholic OH group, 0.9 to 1.1 mol of —NCO groups are used and that all isocyanate groups still present after the reaction are blocked with a ketone oxime.

16. A process as claimed in claim 15, wherein the ketone oxime is butanone oxime, acetone oxime or methyl isobutyl ketone oxime.

17. A process as claimed in claim 1, wherein the $R_F$-group-containing polymer used is a polyacrylate which contains, as monomer building block, a compound of the formula (XI)

$$CH_2=C(R^9)—COO(CH_2)_t R_F \quad \text{(XI)}$$

wherein $R^9$ is hydrogen or a methyl group, t is a number from 2 to 8 and $R_F$ is a monovalent radical of the formula $$CF_3(CF_2)_a$$

and a is a number from 3 to 25, where this polymer may be a copolymer which may comprise further vinylically unsaturated compounds as monomer building blocks.

18. A process as claimed in claim 1, wherein the $R_F$-group-containing polymer used is a polyester obtained by reacting a dicarboxylic acid or a mixture of dicarboxylic acids of the formula (XII)

$$HOOC—(CHR^{10})_r COOH \quad \text{(XII)}$$

with an alcohol or a mixture of alcohols of the formulae (IX) and (X)

$$[R_F(CH_2)_b(Y—CH_2)_c]_2 C(CH_2OH)_2 \quad \text{(IX)}$$

$$HO—CH_2—CR^6 R^7(Y)_d CR^6 R^7—CH_2OH \quad \text{(X)}$$

where all of the radicals $R^6$, independently of one another, are hydrogen or an alkyl radical having 1 to 4 carbon atoms, b is a number from 1 to 4, c is 0 or 1, d is 0 or 1, $R_F$ is $CF_3(CF_2)_a$, a is a number from 3 to 25, $R^7$ is $—(CH_2)_b R_F$ if d=1, and is $—Y(CH_2)_b R_F$, if d=0 and Y is —O—, —S—, —NR— or —PR, where $R^{10}$ is hydrogen or an alkyl radical having 1 to 4 carbon atoms, and r is a number from 2 to 10.

19. A process as claimed in claim 18, wherein the polyester is obtainable by reacting the dicarboxylic acid or dicarboxylic acid mixture with the alcohol or alcohol mixture in a ratio such that, per mole of —COOH groups, a total of 0.9 to 1.1 mol of alcoholic OH groups are used.

20. A process as claimed in claim 1, wherein the dispersant used in process step b) is a nonionogenic dispersant or a mixture of nonionogenic dispersants.

21. A process as claimed in claim 1, wherein the solution obtained according to process step a) comprises components A), B) and C) in the following amounts
0.2 to 50% by weight of A),
10 to 85% by weight of B),
10 to 85% by weight of C),
these values referring to the total amount of solution, but without taking the optionally present component D) into consideration.

22. A process as claimed in claim 1, wherein the dispersion obtained according to process step c) comprises components A), B), dispersant and water in the following quantitative ratios
0.1 to 20% by weight of A),
4 to 60% by weight of B),
0.5 to 20% by weight of dispersant or dispersant mixture,
20 to 95% by weight of water,
these values referring to the total amount of the dispersion, but without taking the optionally present component D) into consideration.

23. A process as claimed in claim 1, wherein the dispersion obtained according to process step d) comprises components A), B), dispersant, water and $R_F$-containing polymer component D) in the following quantitative ratios
0.05 to 10% by weight of component A),
2 to 30% by weight of component B),
0.25 to 10% by weight of dispersant or dispersant mixture,
10 to 60% by weight of water, and
10 to 85% by weight of $R_F$-containing polymer component D).

24. A process as claimed in claim 1, wherein the appertaining anions of the amino groups in the quaternized form of component A) are chosen from chloride anions, methylsulfate anions, benzenesulfonate anions, alkylarylsulfonate anions and carboxylate anions.

25. A process as claimed in claim 24, wherein the carboxylate anions are anions of a monocarboxylic acid having 1 to 4 carbon atoms and the alkylarylsulfonate anions are toluenesulfonate anions.

26. A process as claimed in claim 1, wherein the solution obtained according to process step a) comprises components A), B) and C) in the following amounts
2.5 to 20% by weight of A),
30 to 50% by weight of B),
40 to 60% by weight of C),
these values referring to the total amount of solution, but without taking the optionally present component D) into consideration.

27. A process as claimed in claim 1, wherein the dispersion obtained according to process step c) comprises components A), B), dispersant and water in the following quantitative ratios
0.3 to 8% by weight of A),
15 to 35% by weight of B),
1 to 5% by weight of dispersant or dispersant mixture,
60 to 80% by weight of water,
these values referring to the total amount of the dispersion, but without taking the optionally present component D) into consideration.

28. A process as claimed in claim 1, wherein the dispersion obtained according to process step d) comprises components A), B), dispersant, water and $R_F$-containing polymer component D) in the following quantitative ratios
0.15 to 4% by weight of component A),
7.5 to 17.5% by weight of component B),
0.5 to 2.5% by weight of dispersant or dispersant mixture,
20 to 50% by weight of water, and
40 to 70% by weight of $R_F$-containing polymer component D).

* * * * *